US009524355B2

(12) United States Patent
Forbes et al.

(10) Patent No.: US 9,524,355 B2
(45) Date of Patent: Dec. 20, 2016

(54) METHODS FOR DELIVERING TASK-RELATED DIGITAL CONTENT BASED ON TASK-ORIENTED USER ACTIVITY

(75) Inventors: John B. Forbes, Seattle, WA (US); Paul Maritz, Mercer Island, WA (US); Jonathan L. Herlocker, Seattle, WA (US); Thomas G. Dletterich, Corvallis, OR (US)

(73) Assignee: MOZY, INC., Pleasant Grove, UT (US)

( * ) Notice: Subject to any disclaimer, the term of this patent is extended or adjusted under 35 U.S.C. 154(b) by 1640 days.

(21) Appl. No.: 11/656,894

(22) Filed: Jan. 22, 2007

(65) Prior Publication Data
US 2008/0177726 A1    Jul. 24, 2008

(51) Int. Cl.
G06F 7/00     (2006.01)
G06F 17/30    (2006.01)
G06Q 30/02    (2012.01)

(52) U.S. Cl.
CPC ......... *G06F 17/30997* (2013.01); *G06Q 30/02* (2013.01)

(58) Field of Classification Search
CPC .............................................. G06F 17/30997
USPC ......................................... 707/E17.109, 769
See application file for complete search history.

(56) References Cited

U.S. PATENT DOCUMENTS

| 5,640,553 A | 6/1997 | Schultz |
| 6,101,492 A | 8/2000 | Jacquemin |
| 6,327,590 B1 | 12/2001 | Chidlovskii et al. |
| 6,684,195 B1 * | 1/2004 | Deaton et al. ............ 705/14.13 |
| 6,775,376 B2 | 8/2004 | Hsieh et al. |
| 7,225,187 B2 | 5/2007 | Dumais et al. |
| 7,392,252 B2 | 6/2008 | Tsukada et al. |
| 7,448,022 B1 | 11/2008 | Ram et al. |
| 7,548,915 B2 | 6/2009 | Ramer et al. |
| 7,565,363 B2 | 7/2009 | Anwar |
| 7,617,198 B2 | 11/2009 | Durvasula |
| 7,653,702 B2 | 1/2010 | Miner |

(Continued)

OTHER PUBLICATIONS

Kaminka, Gal A. et al. "Infrastructure for Tracking Users in Open Collaborative Applications: A Preliminary Report." The Maverick Group, Computer Science Dept., Bar Ilan University, Israel.

(Continued)

*Primary Examiner* — Boris Gorney
*Assistant Examiner* — Griselle C Roland
(74) *Attorney, Agent, or Firm* — Muirhead and Saturnelli, LLC

(57) ABSTRACT

A method for automatically presenting digital content to a user of a computer computes task-related metadata from data which may include i) a most recent event record, ii) a most recent specification received from the user of a task being performed by the user, iii) an automatic prediction of the current task being executed by the user, iii) past event records and associated task identifiers stored in a database and/or iv) content in resources associated with a given task. The task-related metadata is communicated to a digital content service provider. Digital content relevant to the user based on the task-related metadata is then selected, sent to the computer, and presented to the user. Rules and filters control the metadata going out and the content coming in, allowing automatic adaptation based on the current task, characteristics of the content, and other factors.

35 Claims, 5 Drawing Sheets

(56) References Cited

U.S. PATENT DOCUMENTS

| | | |
|---|---|---|
| 7,664,734 B2 | 2/2010 | Lawrence et al. |
| 7,676,452 B2 | 3/2010 | Doganata et al. |
| 2003/0033370 A1* | 2/2003 | Trotta .......................... 709/204 |
| 2003/0037041 A1* | 2/2003 | Hertz ................................ 707/1 |
| 2003/0130995 A1 | 7/2003 | Pope et al. |
| 2003/0131013 A1 | 7/2003 | Pope et al. |
| 2003/0131016 A1 | 7/2003 | Tanny et al. |
| 2003/0158855 A1 | 8/2003 | Farnham et al. |
| 2003/0172075 A1* | 9/2003 | Reisman ......................... 707/10 |
| 2004/0153436 A1 | 8/2004 | Pope et al. |
| 2004/0249821 A1 | 12/2004 | Nies et al. |
| 2005/0246360 A1 | 11/2005 | Tanny et al. |
| 2006/0026189 A1 | 2/2006 | Djugash |
| 2006/0036565 A1 | 2/2006 | Bruecken |
| 2006/0136391 A1 | 6/2006 | Morris |
| 2006/0136393 A1* | 6/2006 | Abbott et al. .................... 707/3 |
| 2006/0235873 A1 | 10/2006 | Thomas |
| 2006/0259360 A1* | 11/2006 | Flinn et al. ..................... 705/14 |
| 2007/0005722 A1* | 1/2007 | Chatani ......................... 709/217 |
| 2007/0060099 A1* | 3/2007 | Ramer et al. .................. 455/405 |
| 2007/0124263 A1 | 5/2007 | Katariya et al. |
| 2007/0162907 A1 | 7/2007 | Herlocker et al. |
| 2007/0168354 A1* | 7/2007 | Ramer et al. ................... 707/10 |
| 2007/0244924 A1* | 10/2007 | Sadovsky et al. ......... 707/104.1 |
| 2008/0140679 A1 | 6/2008 | Deyo et al. |
| 2008/0243787 A1 | 10/2008 | Stading |

OTHER PUBLICATIONS

Fenstermacher, Kurt D. et al. "A Lightweight Framework for Cross-Application User Monitoring" (2002). IEEE Computer Society, pp. 51-pp. 59.

Kaptelinin, Victor. "UMEA: Translating Interaction Histories into Project Contexts" (2003). Paper: Integrating Tools and Tasks. vol. 5, Issue 1, pp. 353-pp. 360.

Voida, Stephen et al. "Integrating Virtual and Physical Context to Support Knowledge Workers" (2002). IEEE Pervasive Computing. vol. 1, No. 3.

* cited by examiner

METHODS FOR DELIVERING TASK-RELATED DIGITAL CONTENT BASED ON TASK-ORIENTED USER ACTIVITY

FIELD OF THE INVENTION

The present invention relates generally to techniques for automated delivery and presentation of digital content to computer users. More specifically, it relates to computer-implemented methods for automatically delivering task-related digital content to a computer user while the user is performing a task.

BACKGROUND OF THE INVENTION

Computer devices have become a primary means for delivering digital content to users. One of the challenges in delivering effective digital content is to ensure that the content is relevant to the user; that is, to present content that relates directly to the interests, needs and profile of the user, so that the likelihood of the user effectively utilizing or responding to the provided digital content is increased.

Several attempts to solve this problem have been implemented in the commercial marketplace, including the use of search engine queries to filter and prioritize digital content (specifically advertising) to increase relevance. These methods are inherently limited due to their restricted frame of reference and limited understanding of what task the user is actually working on at any given time.

U.S. patent application 60/757,596 entitled "Methods for Assisting Computer Users Performing Multiple Tasks," which is incorporated herein by reference, describes techniques for assisting and improving the productivity of computer users, and relates specifically to computer-implemented methods for assisting users who switch between multiple tasks in a computing environment. The method includes collecting from multiple executing programs event records that represent state changes in the programs. The event records may be collected, for example, by monitoring state changes in the multiple programs, selecting a subset of the monitored state changes, and generating event records representing the selected subset. The state changes in the programs may result from user interaction, automated processes, network communications, or other interactions between the programs and the computing environment. User interaction, for example, may include various forms of input received from the user, either locally or remotely, such as input resulting from user interaction with various programs or direct user feedback, e.g., correcting predicted associations between tasks and resources. The method also includes receiving from the user a specification of a task being performed by the user, e.g., when a user switches tasks and elects to explicitly specify the task. The user may also specify metadata associated with the task, e.g., information about relationships between tasks or an indication of completion of a task.

Also included in the method is predicting a current task being performed by the user, e.g., applying machine learning algorithms to predict a most probable current task from stored evidence such as past associations between events and tasks. The current task may be predicted based on evidence including: i) a most recent event record, ii) a most recent specification received from the user of a task being performed by the user, and iii) past event records and associated task identifiers stored in a database. Other evidence may also be included such as time since the user last specified a task, past indications of completed tasks, tasks or keywords associated with resources related to the latest event, and explicit associations by the user between tasks and resources. Based on the predicted current task, user interface elements in multiple executing programs are automatically adapted to facilitate performing the current task. For example, the adaptation may include displaying a resource list (such as folders or directories) that contains resources associated with the predicted current task or that contains a menu of recently used resources filtered to favor resources associated with the predicted current task. The adaptation may also include displaying the predicted current task, e.g., in a menu bar of a window. These resources, however, are limited to user resources stored locally, and to resources of users sharing a common task with the user. No techniques are presented for automatically delivering remote content to a user that is relevant to the current user task.

SUMMARY OF THE INVENTION

The present invention provides an improved digital content delivery and presentation method that combines the rich historical event database and the task prediction capabilities of a task-oriented user activity system with digital content delivery techniques. Based on current task information, highly relevant remote digital content is automatically delivered and presented to the user, providing benefits to the user as well as to the remote digital content service provider.

In one aspect of the invention, information in an event database of a task-oriented user activity system is used to help select digital content to be delivered to the user. A method for automatically presenting digital content to a user of a computer comprises computing task-related metadata from i) current task being performed by the user as predicted by a task-oriented user activity system, and ii) past event records and associated task identifiers stored in a database. Task-related metadata is communicated to a digital content service provider. Digital content relevant to the user based on the task-related metadata is then determined. The digital content is then communicated to the appropriate display device such as a computer or mobile phone and presented to the user.

In some embodiments, the task-related metadata is computed also from a most recent event record representing a current interaction of the user with the computer, from a most recent specification received from the user of a task currently being performed by the user, from a list of products associated with the current task, or from information (e.g., categorized products) stored in a resource database.

Embodiments may further include communicating the task-related metadata from the computer to the digital content service provider using a set of rules to schedule transmission of specified classes of the task-related metadata. In addition, embodiments may include filtering the task-related metadata in accordance with an outgoing filter prior to communicating the task-related metadata to the digital content service provider. Conversely, embodiments may include filtering the task-related digital content in accordance with an incoming filter after communicating the digital content to the computer. Presenting the digital content to the user of the computer may include automatically filtering the digital content based on the current task, or based on a list of product items associated with the current task. In many embodiments, presenting the digital content to the user of the computer includes assembling the digital content in a user interface window. In some cases, embodiments may also include modifying the contents of a web browser window containing internet search results, where the modification is based on the current task. The method may also include communicating the digital content to a second computer and presenting the digital content to a user of the second computer.

Embodiments may also include monitoring and recording responses of the user to the presented digital content. In addition, embodiments may include recognizing when the user is likely engaged in a search for a product, determining characteristics of the product being searched for, and adding the characteristics to metadata for a current task. In some embodiments, the task-related metadata includes certification information associated with the user. Some embodiments include predicting from event records when the user is about to purchase a product, and/or recognizing when the user has made a purchase and generating an event indicating that a purchase was made. Tasks that have resulted in purchases may be automatically related to each other, and some embodiments include replicating task-related metadata across a set of tasks based on relationships between tasks. Some embodiments include generating a user purchase history from purchase events and associated information stored in the database, and communicating the user purchase history to the digital content service provider and/or displaying to the user a list of purchases associated with the current task.

Embodiments of the invention may include prompting the user to specify metadata associated with a task. In some cases, embodiments include identifying keywords in a user-specified text description of a task, and selecting metadata based on matching the identified keywords with keywords in a database containing predetermined keywords and associated metadata.

The digital content relevant to the task may be determined from the task-related metadata by matching the task-related metadata with a set of predetermined user contexts and selecting content associated with matching contexts, and/or by predicting the digital content relevant to the task using relationships between tasks.

DETAILED DESCRIPTION

Task-Oriented User Activity System

Figure 1:
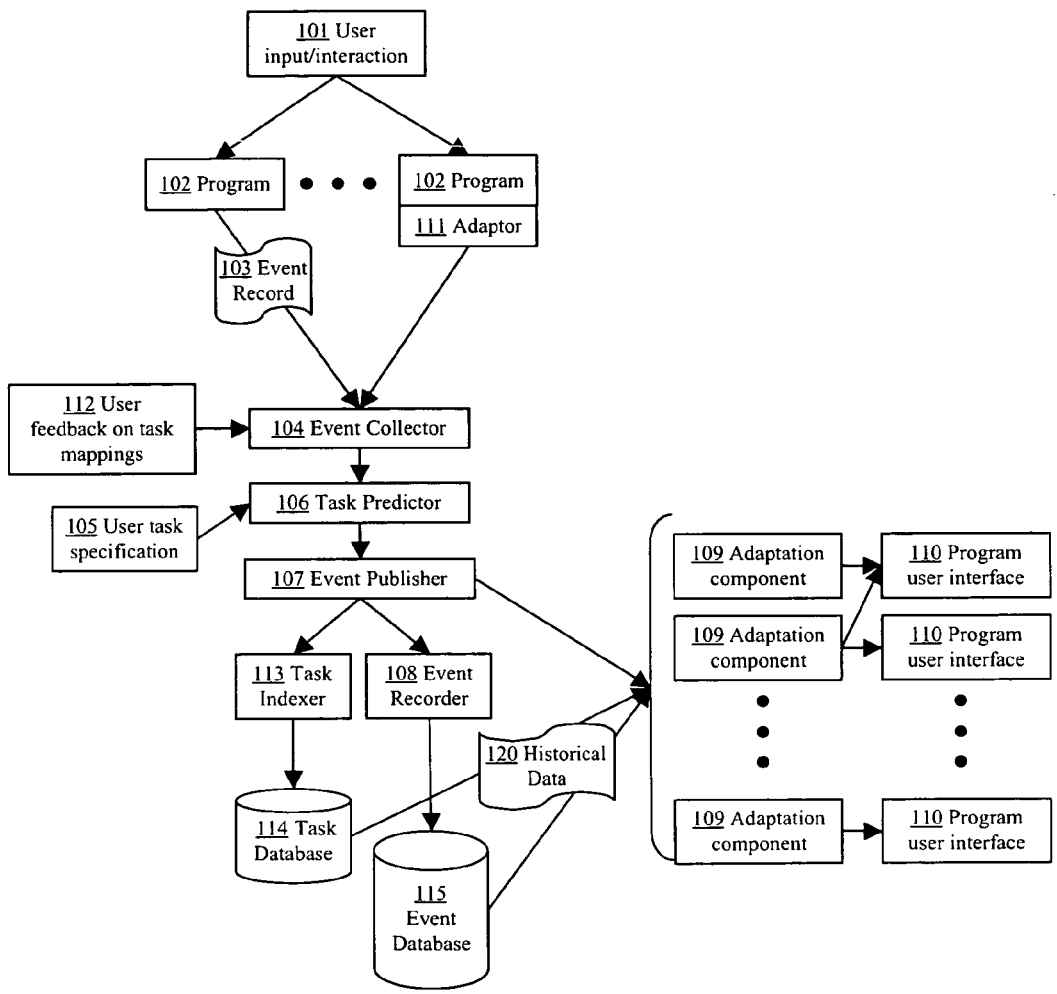
FIG. 1 is a block diagram of a task-oriented user activity system used as part of an embodiment of the present invention.

Preferred embodiments of the present invention include an augmented task-oriented user activity system that is modified to include new intelligence. Details of an unmodified task-oriented user activity system are illustrated in FIG. 1. The user interacts with a computer interface to generate user input 101 received by software application programs 102 which forward event records such as event record 103 to an event collector 104. An adaptor component 111 may assist in the generation and forwarding of the event records. The event collector 104 communicates event records to the task predictor 106, which then applies machine learning to predict the current task that each event is associated with. Each event record may then be associated with a task. In addition, a current task being performed may be predicted. At any point in time, the user can specify what task they are working on through a computer interface to generate a user task specification 105. They may also specify metadata about that task. This specification becomes evidence for the task predictor 106, which associates event records with tasks to produce labeled events. The labeled events are then sent to event publisher 107 which publishes them to various components, including event recorder 108, task indexer 113, and one or more adaptation components 109. Event recorder 108 writes the labeled event records to a history event database 115, which is then accessible by components such as the adaptation components 109. The task indexer 113 updates the task database 114 with the labeled event records. The task database maintains the current beliefs of the system regarding what resources are associated with which tasks, and possibly which events are associated with which tasks. It may also maintain statistics about each task, such as the last time that a task was accessed or the number of times that a task has been accessed in the recent past. Adaptation components 109 receive task-labeled event records from the event publisher 107 and, in response to the events, adapt one or more software program user interfaces 110 in a manner that is appropriate for the task associated with the most recent event or events. User interfaces 110 will typically correspond to programs 102 that the user is interacting with. The adaptation components can also access the historical data 120 including past events from the event database 115 and the current set of beliefs about what events and resources are associated with which tasks, stored in the task database 114.

The user can also view the mappings of events and resources to tasks, and can provide feedback 112 on those mappings, indicating that one or more events or resources do not belong in a task, moving one or more events or resources from one task to another, or indicating that one or more resources should be added to a task. This feedback is communicated to the event collector 104. Those event records propagate like all other event records to the task indexer 113 and the event recorder 114. The task indexer corrects its task database 114 in response to the user feedback.

Figure 2:
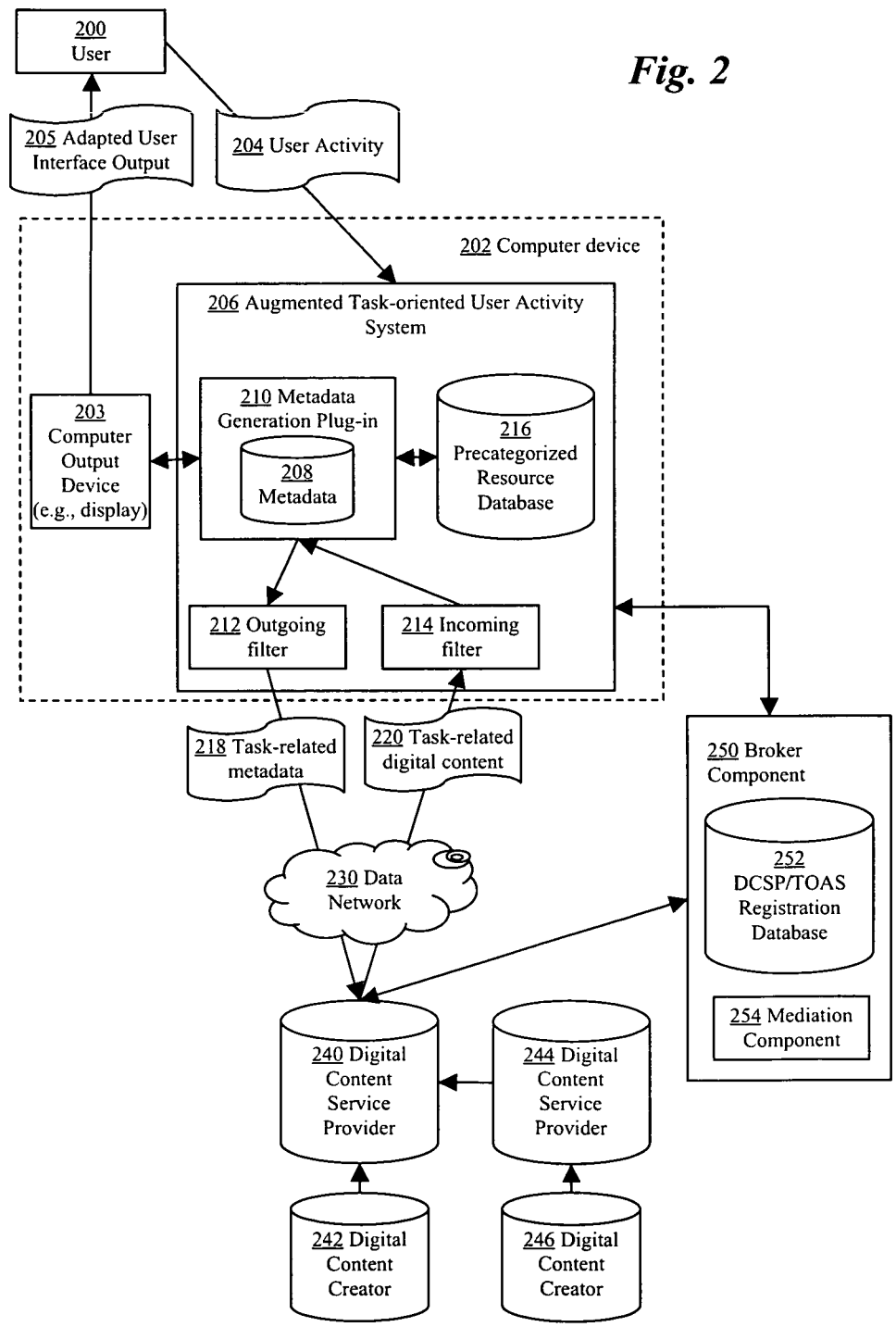
FIG. 2 is a block diagram of a task-related digital content delivery system according to an embodiment of the invention.

FIG. 2 is a block diagram of a system for implementing a method of delivering task-related digital content based on task-oriented user activity according to a preferred embodiment of the invention. A user 200 interacting with a computer device 202 generates user activity 204 that is captured by an augmented task-oriented user activity system 206, which includes the components and features of the system described above in relation to FIG. 1. In addition, the augmented system 206 includes a metadata generation plug-in component 210, outgoing filter 212, incoming filter 214, and precategorized resource database 216. In some embodiments, augmented system 206 may also include various other modifications of the system shown in FIG. 1, as will be described below. Computer device 202 may be, for example, a desktop computer, laptop computer, or a handheld computing device such as a cell phone or personal digital assistant. In a preferred embodiment, task-oriented user activity system 206 includes one or more metadata generation components, such as plug-in component 210, that generate task-related metadata, in some cases using information from precategorized resource database 216. The task-related metadata are then stored in a metadata database 208. An outgoing filter component 212 filters the task-related metadata 218 and sends it from computer device 202 to a digital content service provider 240 via a wired and/or wireless digital data network 230. Digital content service provider 240 uses the task-related metadata 218 to select task-related digital content 220 which is then sent to the computer device 202 via the digital data network 230. At the computer device 202, an incoming filter 214 filters the digital content which is then presented appropriately to the user 200 via adapted user interface output 205. Digital content may originate at a primary digital content service provider 240, a secondary digital content service provider 244, and/or digital content creators 242 and 244. A remote broker 250 in communication with both the computer 202 and digital content service providers may also mediate or assist with the communication of task-related digital content as well as task-related metadata.

In the context of the present description, "digital content" such as content 220 refers to any digital media or information that may be communicated electronically to a user's computer device via a computer network. Typically, the content is presented to the user on an output device 203 such as a visual display and/or audio device that is part of the computer device 202. Digital content includes (but is not limited to) text, audio, video, or images that relate to or assist the user in performing the task at hand. For example, task-related reference content may include articles and papers relating to a user whose current task is performing scientific research; current quotes and relevant financial news for a bond trader; or maps, flight timetables and ticket prices for the user who is currently planning a trip. Examples of task-related advertising content may include messages that encourage a user to buy a particular item or class of items, messages that build positive impressions of a brand, messages that encourage a user to take an action, such as voting; and promotional offers to the user to provide a product or service at a special price or special value.

In the present description, a "digital content service provider" (DCSP) such as provider 240 is any individual or business entity that provides digital content to computer users over a computer network. For example, a DCSP may provide content that is relevant to a task that the computer user is working on. The DCSP can be the originator of the digital content, or an intermediary that is brokering this content for other providers such as provider 244 and/or content creators such as creators 242 and 246. Examples of DCSPs would be advertisers, advertising middlemen, cable TV operators, corporations, book publishers, information aggregators, bloggers, brokerage firms, travel agencies, retail stores, and other entities that may want to deliver task-related digital content to consumers, researchers, employees or other computer users.

In the task-oriented user activity system 206, tasks represent units of work that are meaningful to users. In the present description, "task-related metadata" such as metadata 218 refers to user metadata that is representative of or related to a task that a user has recently been or is currently performing. Examples include, among other things, the fact that the user is planning a trip; that the user is currently looking to purchase a digital camera; that the user just bought a car; or that the user is looking to purchase a new 19-inch flat panel monitor and is accepting offers for under $200. Task-related metadata may include categorizations of user activity that assist in matching users with digital content relevant to their current task. For example, the metadata may assist a content provider in identifying when potential customers are in task-related contexts where particular digital content might have greater impact or conversion rates.

Metadata can be represented in a variety of ways. One possible representation is as an ordered triplet (task, property, property-value). The "task" component of the triplet indicates the task in question (which might be a task specified by the user, e.g., "Christmas shopping," or a task that has been inferred by the system). The "property" component of the triplet is an identifier of a specific metadata property (e.g., "purchase"), and "value" the value of the property in question (e.g., "Logitech MM50 Speakers"). The metadata may also be represented as a hierarchy of information nodes, such as XML, or as a graph of information nodes, such as RDF. The hierarchical representation (like XML) allows the metadata to cleanly represent nested metadata attributes. Table 1 shows one possible XML representation.

TABLE 1

XML Task-Related Metadata Example - Product Purchase

```
<task>
    <name>Christmas Shopping</name>
    <metadata>
        <purchase>
            <time>November 10, 2006, 20:16:18 US PST</time>
            <product>
                <name>Logitech MM50 Speakers</name>
                <category>Speakers, Computer</category>
            </product>
            <location>
                <name>amazon.com</name>
                <URL>http://www.amazon.com/...</URL>
            </location>
        </purchase>
    </metadata>
</task>
```

For compactness and readability, the example in Table 1 illustrates only some of the various possible properties. One versed in the art could identify and include other appropriate associated properties, such as those for the product and the purchase location, method of payment, method of delivery, etc.

In one embodiment, the task-related metadata are stored in a relational database 208. In another, the metadata are stored as XML files. Other embodiments can use data storage mechanisms that encode hierarchical or relational data for high performance or for distributed replication and access.

Figure 3:
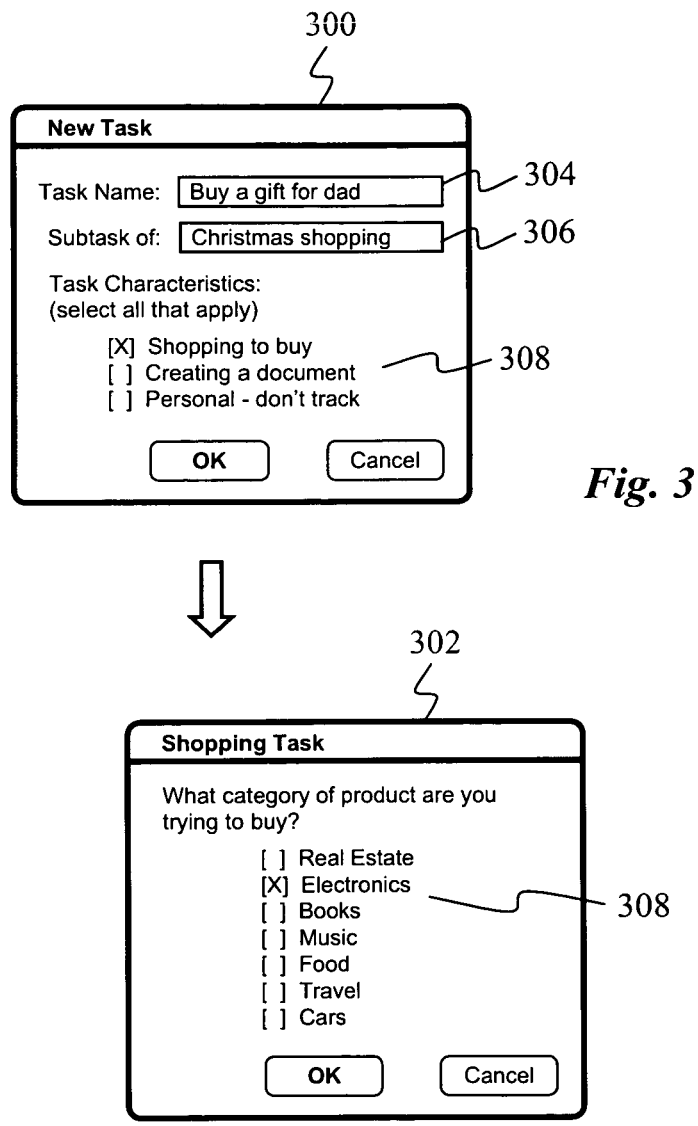
FIG. 3 illustrates a pair of related user interface windows used to manually specify new task characteristics according to an embodiment of the invention.

As illustrated in FIG. 3, the user may provide task-related metadata directly. For example, user interface windows 300 and 302 allow a user to define a new task with specified metadata. In initial window 300, the user specifies the name of a new task in text entry field 304, optionally defines a parent task in text entry field 306, and then selects appropriate task characteristics in check-box list 308. In the example shown, one of the task characteristics that can be selected ("Shopping to buy") indicates that one of the goals of the task is to purchase an item. If the user has selected this characteristic, then when the user clicks the OK button, the second window 302 appears to collect more specific metadata information. In the example shown, the window 302 allows the user to specify what type of product the user is looking to buy by selecting an appropriate product category from a check-box list 308. In one embodiment, after a user has clicked the OK button of window 302, an XML task-related metadata record is generated that looks like the following:

TABLE 2

XML Digital Content Metadata Example - User Supplied Data

```
<task>
    <name>Buy gift for dad</name>
    <create-time>November 10, 2006, 18:14:22 US PST</create-time>
    <metadata>
        <shopping>
            <user-specified>true</user-specified>
            <metadata>
                <category name=electronics />
            </metadata>
        </shopping>
        <private>false</private>
    </metadata>
</task>
```

One versed in the art could identify other appropriate associated properties that could also be included in the metadata record, such as those for the product brand, model, price, and purchase location.

Figure 4:
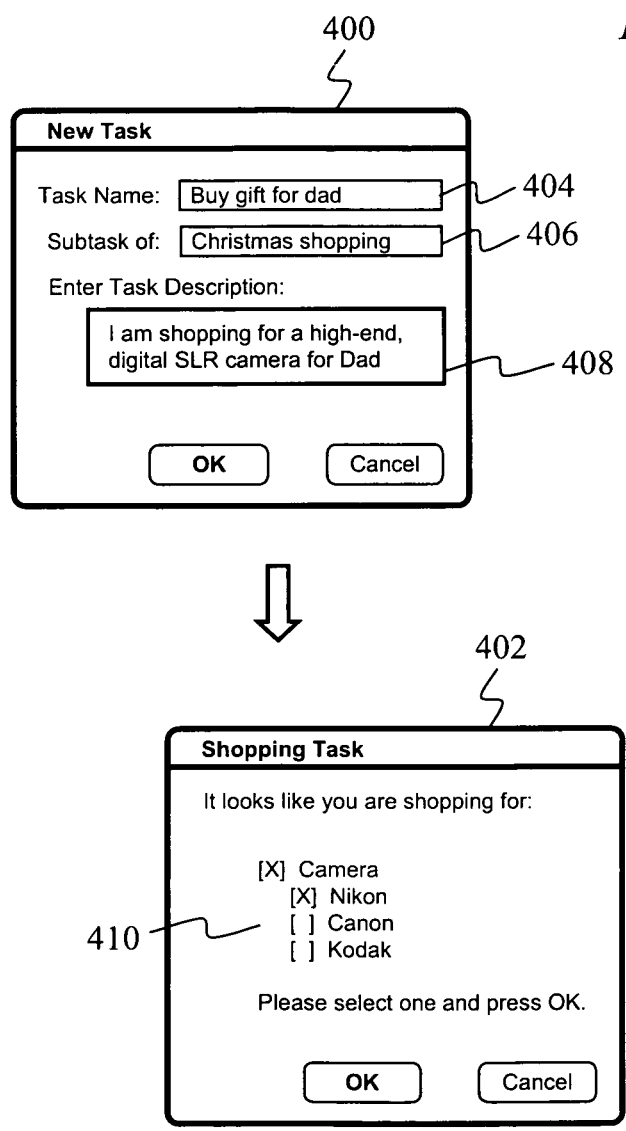
FIG. 4. illustrates a pair of related user interface windows used to automatically specify new task characteristics according to an embodiment of the invention

FIG. 4 provides another example of how a user can specify task-related metadata when creating a task, according to an embodiment of the invention. User interface window 400 shows a dialog box that appears when a user wants to create a new task. In addition to text entry field 404 for specifying the task name and text entry field 406 for specifying the parent task, there is also a text entry field 408 for specifying a description of the task. When the user clicks OK in window 400, a second user interface window 402 appears which allows the user to further specify metadata. Preferably, text analysis processing predicts from the description provided in field 408 additional likely metadata that should be assigned to the task and displays this predicted metadata in a check-box list 410 in window 420 for user confirmation or editing. The text-analysis processing architecture is preferably modular, so that it is easy to change the method of text processing used by exchanging one text processing module for another. In one embodiment of the invention, a keyword matching text-analysis technique is used. Specifically, the task description text in field 408 is converted into a keyword vector, where each component of the vector is a weight representing an importance of a keyword in the task description contained in field 408. This keyword vector is then compared to a set of predetermined keyword vectors representing categories (such as "Nikon" or "Digital Cameras") using similarity metrics such as the inner product between two vectors. Vectors for categories can be created through a variety of methods, either by hand-choosing the words for the vectors, or simply aggregating the words found in a collection of documents related to a category. The keyword matching may be based on text processing methods known in the art, such as those described in *Modern Information Retrieval*. 1999. Ricardo Baeza-Yates and Berthier Ribeiro-Neto. Addison Wesley. In another approach, known techniques for named entity extraction are used to identify names of products, people, or events that the user might be looking for. Such techniques may include, for example, those described in Bikel, D. M., Schwartz, R. L., & Weischedel, R. M. (1999). An algorithm that learns what's in a name. *Machine Learning Journal*, 34, 211-231.

Alternately, the user may specify similar task-related metadata information for a pre-existing task that is already in progress.

Task-related metadata can then be used to connect the user with appropriate DCSPs. As described in more detail later in this document, "appropriate" DCSPs are DCSPs that have content that the user's filters will allow through and that have specified an interest in distributing content to users that have metadata such as the user has specified for their tasks. For example, a website that sells electronic goods may specify that it wishes to display a particular advertisement to anybody whose task-related metadata indicates that they are currently working on a task that is likely to result in the purchase of electronics. The user may simply indicate that a purchase is intended, or may provide additional information, such as a description of the exact product desired and the timeframe of the intended purchase, or more general information such as a description of the functionality desired. The user may also specify desired specifications in a structured way that would allow DCSPs to match those specifications against the specifications of products for which they are serving advertisements or other digital content.

In addition to explicit specification of metadata by the user, task-related metadata may also be computed and associated with a task automatically. For example, metadata concerning past purchases by the user can be collected by the task-oriented user activity system. In one embodiment of the invention, a metadata generation plug-in 210 is installed on the user's computer 202 as part of augmented task-oriented user activity system 206. Plug-in 210 detects when the user makes a purchase and then extracts purchase details. This purchase information can then be used to infer that the current task is a particular purchasing task, and the task can later be associated with other purchasing tasks. One method for detecting that a user has made a purchase is detecting web browser forms that have fields for credit card numbers that are submitted by the user. Another method is identifying credit card transactions by speech recognition on phone call transcripts. Another method involves applying a learning algorithm to construct a predictor, such as a support vector machine, to identify text and text structure features in web pages that signify pages where a purchase has been made. In some embodiments, when a purchase is detected, a new event is generated indicating that a purchase has been made. Once a purchase has been detected, the augmented task-oriented user activity system 206 extracts metadata about the purchase, which may include details such as the brand and/or model of the product purchased, the category of the product purchased, the price, the vendor, and any contractual information with respect to the purchase such as warranty period, restocking fees, and the like. This information can then be used to generate metadata for the task that may be useful for inferring metadata about other purchasing-type tasks. Similarly, the augmented task-oriented user activity system 206 could detect when a user is searching an online database for information and infer that the user is performing a research-type task.

In another embodiment of the invention, the augmented task-oriented user activity system 206 automatically associates metadata with a task by exploiting hierarchical relationships among tasks. Consider a knowledge worker who must travel frequently to business meetings. This worker could define a "trip" task with subtasks for each of the various trips with names such as "chicago jan 15", "new york jan 28", etc. By applying machine learning methods, the metadata generation plug-in can discover that all of the children of the "trip" task involve purchasing airplane tickets, hotel rooms, and rental cars. When the user defines a new subtask of "trip", the metadata generation plug-in automatically associates these items as "shopping list" metadata with the new subtask. Through textual analysis of the task name, email messages and the user's calendar program, the metadata generation plug-in also identifies the likely dates and destination of the trip, and associates these with the task. This information could be confirmed or refined when the first purchase (e.g., the airplane ticket) is made.

Since the purchase event and associated information is stored in the database of the task-oriented user activity system 206, the system can generate a user purchase history either as a reference for the user (for instance as a list of Christmas presents already purchased) or compiled into digital content metadata as shown in the examples above and provided to the DCSP as a historical list of purchases that can be used as input for any method that the DCSP may choose to use to determine potential purchase preferences, relevance of given types of advertising content, or other relevant characteristics of a given user or set of users related to purchasing behavior.

A task may involve purchasing multiple items. For example, one task of the user might be "equip home office", and the items to purchase might include a computer, printer, fax machine, copier, and telephone. In some embodiments of the invention, the task-oriented user activity system 206 provides an interface for the user to define a "shopping list" for the task. The system can then organize metadata, digital content, and purchase events around each item (or subsets of items) on the shopping list. A DCSP might then present the user with an offer for an individual item in the list, a subset of items, or all of the items on the list.

In some embodiments of the invention, the purchase history is combined with the "shopping" metadata to create a list of items that remain to be purchased as part of the current task. This list is then displayed to the user through an interface provided by the metadata generation plug-in to serve as a "to do" list for the user. This interface also provides a way for the user to indicate that they have already made the purchase or that they do not intend to make the purchase. This provides training feedback to the machine learning algorithms in the metadata generation plug-in.

Embodiments of the invention can improve the relevance of digital content delivered to the user by recognizing general classes of activities (e.g., researching travel destinations), recognizing specific items of information within that activity (e.g., date of departure, destination) and inferring specific items related to that activity (e.g., suitcases, golf clubs). Task-related metadata can be generated automatically to encapsulate this information and make it available to DCSPs.

To give an example of how metadata can be automatically generated, consider the case where a user is browsing the web shopping for cruises. The task-oriented user activity system software 206 generates events in response to user interactions with software. One such event is generated every time a user visits a new web page. As described in more detail later, in one aspect of the invention, the metadata, event, and/or task information provided by the task-oriented user activity system 206 is combined with a pre-categorized resource database 216 that lists resources that a user may use in their day-to-day activities in pre-classified categories that are useful for determining user activity. In this example, the database includes a list of URLs that have been categorized as related to shopping for or reading about cruises. As the user visits these cruise-related web sites, the metadata generation component 210 automatically adds metadata to the task. For example, Table 3 shows an example of such metadata in XML format.

TABLE 3

XML Digital Content Metadata Example - Combining with Pre-Classified Resource Database

```
<task>
  <metadata>
    <shopping>
      <user-specified>false</user-specified>
      <metadata>
        <category name=cruises>
          <evidence>
          <URL name="http://www.carnival.com" visits=5 >
          <URL name="http://www.royalcaribbean.com" visits=10 >
          <evidence>
        </category>
      </metadata>
    </shopping>
    <private>false</private>
  </metadata>
</task>
```

In another embodiment of the invention, task-related metadata may be automatically assigned to a task by comparing that task with other previous tasks and, if appropriate, using task-related metadata associated with them. For example, the user may have previously purchased a digital camera, and created a task named "Buy Camera." Consequently, the "Buy Camera" task is associated with task-related metadata indicating that a camera was purchased, the cost of that camera, the web page where it was purchased, other web stores where the user shopped, web sites where the user read product reviews and comparisons, and so on. Now suppose the user is shopping for a new television and creates a new task called "Investigate New TV." The metadata plug-in monitors their activity on the new task, and compares that activity to past activity on previous tasks for which task-related metadata already exists. The metadata plug-in discovers that the user is performing many of the same actions that were performed for the "Buy Camera" task. Thus, the metadata plug-in can automatically add task-related metadata to the "investigate new TV" task that indicates that the user is "looking to buy a product."

The metadata generation plug-in can automatically label tasks with "looking to buy a new product," as described in the previous paragraph. The task-oriented user activity system 206 can also learn more specific categories, such as what category of product the user is looking for, by collecting all previous tasks where a purchase of a product of a certain category was made and using those tasks as training examples. A machine learning algorithm is then applied to learn a classifier that will take the user's activity on a current task and predict which category of product they are looking to buy. Suitable machine learning algorithms known in the art include, for example, a support vector machine or a Bayesian network as described in Richard O. Duda, Peter E. Hart, and David G. Stork. 2001. *Pattern Classification, 2<sup>nd</sup> ed.* John Wiley and Sons. 259-265. More specifically, the user interaction events recorded on a task by the task-oriented user activity system 206 become features for the machine learning algorithm, which then learns to classify tasks into one or more classes, using the previously observed tasks in each class as examples of that class. For the "looking to buy a new product class," the task-oriented user activity system 206 might collect all previous tasks where the metadata indicates that a product was purchased as positive training examples, gather the user interaction events collected for those tasks, and then feed those into the machine learning component. The machine learning component then outputs a classifier that takes as input a new task and its associated events, and produces an estimation of the likelihood that the user is looking to buy a product. In one embodiment of the invention, the machine learning algorithm is a modular component of the metadata plug-in that can be easily replaced with a component implementing a different algorithm. One of the features input into the machine learning algorithm can be the time that a purchase happened, allowing the machine learning algorithm to base its predictions of purchases on the current time of day or time of year. For example, a user may be more likely to purchase a cruise after 5 PM, and people are more likely to buy electronics during the weeks just prior to Christmas than during other weeks of the year.

The DCSP can use various analysis techniques on digital content metadata to determine whether content will be relevant to a user or whether a user is likely to take a desired action if supplied with given content. A template defining the digital content metadata structure is known by the DCSPs, and it will have algorithms for receiving and analyzing the digital content metadata. For example, a DCSP may extract from the metadata historical purchase information such as the product type and product name, and then the DCSP may use this purchase history to match appropriate digital advertising content with the purchase histories of the user. DCSPs could also employ collaborative filtering algorithms and other recommendation technologies to determine digital content that would be appropriate to send to customers based on their historical purchasing or task data.

In the case where a DCSP 240 is aggregating data on tasks, it can learn a model across tasks from many different users. A DCSP can learn from many users so that it can better predict from activities of a given individual user that the user is looking to purchase a particular category of product. These models can be learned offline on a sample of data, and then applied by the DCSP to an individual user's tasks. First, the training tasks are aggregated by the DCSP across all users, and a single model is learned for all users. Second, in some embodiments of the invention, when a single model is learned from training data from multiple users, the machine learning features of each task are augmented with metadata about the user. In this way, the machine learning algorithm can customize predictions of classes such as "looking to buy a product" depending on features about the user, such as their age, gender, or aggregate statistics of their past behavior (i.e., how many purchases they have made overall in the past month).

The task-oriented user activity system 206 can combine task-related metadata with user credential data to enhance the value of the digital content metadata provided to the DCSP. The DCSP can then use a variety of techniques to further refine appropriate digital content for the target customer, including standard approaches like using credit ratings, socioeconomic classification, credit card purchasing and payment histories to better match products and services to customers. Credential data may include items such as credit card membership, credit data, purchase history, address and contact information, and other demographic data. In contrast with conventional customer profiling systems that use static credential data, the task-oriented user activity system 206 can combine static information with dynamic information such as the current task to provide a profile such as "a customer who is an American Express Gold card holder who is planning a trip to England right now". Credential data can be automatically deduced by the metadata plug-in using techniques similar to those described above for deducing when a purchase is made, or be provided by third parties.

In the following example, the task-oriented user activity system has combined i) Current Task—European Trip Planning; ii) Credentials—the fact that the user is a American Express Gold cardholder in good standing; iii) Event History—the fact that the user has visited the Travelocity website, and iv) Itinerary—the content "Italy Trip" that the task-oriented user activity system has extracted from the user's itinerary on their computer.

This metadata could be very useful to a provider of travel services. They could offer the user plane tickets and hotel reservations for Europe (and specifically for Italy), include promotional offers from American Express, and know that the user had visited a competing travel services site like Travelocity.

TABLE 4

XML Digital Content Metadata Example
Credentials, Event History, and Itinerary

```
<task>
    <name>European Trip Planning</name>
    <metadata>
        <credentials>
            <AmericanExpress>
                <level>gold</level>
                <standing>good</standing>
            </AmericanExpress>
        <credentials>
        <browsing history>
            <URL name="www.travelocity.com" />
        </browsing history>
        <itinerary>
            <description>Italy Trip</description>
            <daterange>10/24/2007–10/28/2007</daterange>
        </itinerary>
    </metadata>
</task>
```

One embodiment of the invention supports metadata generation software components 210 designed to interface with the task-oriented user activity system 206 on the user's computer 202. Metadata generation components analyze the event stream from the task-oriented user activity system software and generate task-related metadata using the methods described above. Preferably, the components 210 are implemented as metadata generation plug-ins which may be distributed and installed together with the task-oriented user activity system 206, or the components may be distributed and installed separately. The plug-in architecture allows additional metadata generation plug-ins to be connected to the task-oriented user activity system 206 at a later date. For example, an existing plug-in may not yet have the ability to detect that the user is searching for a car. A DCSP may later provide a specialized plug-in that can detect that the user is searching for a car based on the user's history of interaction with a web browser and generate metadata indicating that the user is likely looking for a car.

To enable greater levels of privacy for the user, some embodiments of the augmented task-oriented user activity system 206 include an outgoing metadata filter 212 that controls task-related metadata sent from the device 202. For example, the outgoing metadata filter 212 can limit certain classes of task-related metadata from being communicated to the DCSP 240. The outgoing metadata filter 212 can filter task-related metadata on a variety of dimensions. For each dimension, the user can specify what classes of task-related metadata can be allowed through and what classes should be filtered out. For example, outgoing metadata can be filtered:

Per Task. Can specify per task what task-related metadata should be allowed through or filtered out.

Per Recipient. Can specify per recipient (DCSP) what task-related metadata should be allowed through or filtered out.

Level of Detail. Can specify what level of detail of task-related metadata should be allowed through or filtered out. The most specific level of detail would be sending the raw events collected by the task-oriented user activity system. Coarser levels of detail would involve sending more abstract information that represents a greater aggregation, such as "the user bought an expensive European car", or "the user bought a car." More abstract information (coarser detail) may be obtained by user specification or by aggregating more detailed information.

Per Time Period. Filter out according to when task-related metadata was created or updated. Examples include "only during office hours", "only after 5 PM," or "Only for the next 30 minutes." Another possibility is that a set of task-related metadata is limited to a single use by the DCSP.

In Accordance with Agreed Terms and Conditions. The task-oriented user activity system can provide support for agreed terms and conditions between the user and the DCSP. These agreed terms and conditions describe exactly how a DCSP can use the task-related metadata of a user. These conditions may include but are not limited to all of the previously defined means in which task-related metadata can be filtered.

Agreed terms and conditions can be achieved through several means:

Through a specific negotiation with the DCSP or an advertiser, that may be initiated by either party, or even initiated by the DCSP for a negotiation between another DCSP and the user.

The user may also set "Implied Terms and Conditions" for certain classes of task-related metadata. Implied terms and conditions means that the user specifies that certain classes of task-related metadata can only be used if the DCSP agrees to terms and conditions that the user has already specified. Thus the data is made available, and the DCSP wishing to use the data must explicitly assert that they will follow the specified implied terms and conditions. An alternative is that when the DCSP begins a relationship with the user, they assert that they will follow all implied terms and conditions—in such a case, an assertion is not necessary for every piece of data. However, the software on the user's computer must always be able to make available to the DCSP the current list of implied terms and conditions.

Terms and conditions can contain agreements regarding compensation in return for use of task-related metadata. Compensation can include anything that is traditionally considered as compensation, including money, discounts, options, and other items of value. With implied terms and conditions, the advertiser or DCSP must agree to pay the specified compensation before they can receive the desired task-related metadata.

In one embodiment of the invention, a set of rules is used to configure the outgoing filter. For example, some rules can control when metadata is sent. According to such timing rule setting, the task-related metadata 218 may be continuously or periodically transmitted from computer device 202 to DCSP 240. Task-related metadata may be sent immediately after it is generated, it may be buffered until a certain amount of data has accumulated, or it may be sent on a periodic schedule, or some combination of all of these. In one embodiment of the invention, a rule system on the computer device 202 contains the set of rules. Each rule specifies a class of task-related metadata items to match together with a description of how and/or when that task-related metadata should be communicated to one or more DCSPs. For example, in one embodiment it is possible to define rules as follows:

```
<outgoing-rules>
    <order>Deny, Allow</order>
    // by default, deny all
    <deny-to>All</deny-to>
    // allow xyzcompany and pdqcompany to receive my data with no restrictions
    <allow-to URI="http://www.xyzcompany.com" />
    <allow-to URI="http://www.pdqcompany.com" />
    // allow jcompany access to know metadata related
    // to shopping
    // for electronics on tasks 3, 345, and 6770
    <allow-to>
        <task id=3 /><task id=345 /> <task id=6770 />
        <URI= "http://www.jcompany.com/">
        <limit-to>
            <path>metadata/shopping/metadata/
            electronics</path>
        </limit-to>
        </metadata>
    </allow-to>
</outgoing-rules>
```

While these rules can be manually edited by the user in some embodiments, these rules will be most commonly created through a user interface for building rules, similar to a user interface that one might find for the rule systems in well-known email client application programs.

Digital content originates with the creator of that content, is sent to the DCSP 240 (if the DCSP is not the creator), and from there is communicated via the data network 230 to the task-oriented user activity system software on the user's computer device 202. Content 220 that reaches the user's device may be presented to the user as part of adapted user interface output 205. Preferably, the content can be presented in different formats as appropriate for the device. For instance, the content could be text for a computer, or an audio file for a mobile phone.

In one embodiment of the invention, an incoming content filter 214 is included which can be configured to allow through or filter out incoming digital content based on a variety of dimensions, i.e., characteristics, of the digital content. DCSPs will provide digital content using a predefined format similar to the XML examples provided above. The DCSP will also provide a template describing the format of the content, allowing the incoming data filter and task-oriented user activity system to parse and act on the data. Digital content is communicated from the DCSP to the task-oriented user activity system via a digital content record, which is in a structured format that describes the media to be displayed, metadata about that content, and the context in which the content is to be displayed. This digital content record can be encoded in any structured format that enables specifying parameters and their values. In one embodiment of the invention, the digital content record is encoded using XML. The digital content record can also contain references (e.g., URLs) to files stored on remote servers that can be fetched (e.g., using a protocol such as HTTP) when needed. Media to be presented to the user (e.g., pictures, videos, flash presentations, text, audio) may be stored in a separate file that is referenced from the digital content record or encoded within the digital content record. The metadata within the digital content record describes the media, the context in which the media should be displayed, and can have information about the source of the media, copyright information, contractual information, privacy policy information, information to support debugging and anything else that the content creators or DCSP felt was important to include.

The digital content record contains the data (or references to the data) and metadata information to assist the task-oriented user activity system in identifying how to display the content (such as a description of the content type). The digital content record is also extensible to support any additional named attributes that content creators or DCSPs wish to communicate or have recorded. Examples of common metadata information in a digital content record include:

- Means of presentation. How does the content need to be presented to the user? Does it have a visual representation? An audio one? If visual, is it a single image, or an animation/movie? If visual, what is the necessary screen space? If the presentation changes over time, how long does it take to run? Examples of potential visual representations include a "dashboard" or "portal page", further explained below.
- Window where digital content will be displayed, if visual. For example: in web browser, email application, on the desktop, toolbar of an application, taskbar at the bottom, sidebar, tray icon, start menu, help menu, dialog box of application, newly created window, mobile phone display, etc.
- Context of display. That context that triggers the presentation of this content. Examples include: activation of a particular task, display of a particular resource (web page, document, etc), sending a specific search query, sending any search query, posting certain kind of information to a web site, utilizing a particular web service, activating particular user interface controls.
- Category of product or service that will be presented to the user. Examples include: advertisement, images, text; if advertisement for product, the product category (i.e., digital camera); if product, is some sort of offer being presented to the user (e.g., discounts, etc)
- Detailed metadata about content. Examples include: product name, price, name of vendor, technical specifications, etc.
- Digital content service provider. Name, location, company, digital signatures, etc.

Following is an example of a digital content record in one embodiment of the invention in which XML is used to encode the record.

```
<content-record>
    <media>
        <media-file tag="npr-rss"
        url="http://www.npr.org/rss/rss.php?id=1001"
        Content-Type="application/rss+xml "/>
    </media>
    <display-context>
        <file>npr-rss</file>
        <task>Personal/News</task>
        <application>iexplore.exe</application>
        <window>rssfeedviewer</window>
    </display-context>
</content-record>
```

In one embodiment of the invention as described previously, the task-oriented user activity system includes an incoming content filter 214, which identifies properties of incoming content and controls which content can be communicated to the user based on the identified content properties, filter settings, a current state of the task-oriented user activity system, and/or other factors. The incoming content filter 214 can be configured by the user by changing the filter settings, e.g., using a user interface. The user can, for example, opt in on having digital content displayed while working on certain tasks, and digital content can automatically be turned on and off when switching tasks, as appropriate. This automatic control can be configured by presenting the user with a dialog box that lists the tasks that the task-oriented user activity system is aware of, and allowing the user to toggle the display of digital data on or off for a particular task. When the task-oriented user activity system switches tasks, either automatically or through direct user input, the display of digital data can be automatically turned on and off. The incoming content filter can also be configured by whomever initially distributes the task-oriented user activity system software to the user's computer. In some embodiments, the software may be configured such that the user is limited in what ways they can modify the incoming content filter 214. For example, a user may receive the task-oriented user activity system software and supplementary metadata generation components for free in return for agreeing to accept content in the form of certain kinds of advertisements. The software may then be configured to prevent the user from breaking that agreement.

The incoming content filter 214 can be configured to allow through or filter out digital content based on a variety of dimensions and/or other factors. These dimensions include any of the properties defined in the digital content record described above. Thus a digital content record can be filtered out depending on values of the properties set within that record. Digital content records may also be filtered out depending on the state of the task-oriented user activity system. Characteristics of the state of the user activity system include

- Task State and Task Metadata. The software can filter by the current task, previous task, etc, and any metadata associated with those tasks. For example, a user may not want a particular type of content when they are in their "Personal/News" task or when they are working on any task tagged as "personal".
- Time period. Certain or all types of content can be filtered out during certain times of day.
- User's current active window, user interface element, or active application. For example, types of content can be filtered based on whether the user is currently using a web browser, an email application, user interface menu, dialog box of application, etc.

Once a DCSP is aware of a task-oriented user activity system, it can transmit digital content records to that system. Conversely, once a task-oriented user activity system is aware of a DCSP, it can transmit metadata to the DCSP. In one embodiment of the invention, there is a broker component 250 (FIG. 2) that "brokers" connections between DCSPs and task-oriented user activity systems.

In one embodiment, the broker 250 is composed of two registry components, a DCSP registry, and a task-oriented activity system (TOAS) registry, shown in FIG. 2 as DCSP/TOAS registration database 252. When the TOAS initializes, it will send a message to the TOAS registry component in the broker 250 with a network address where it can be contacted. Likewise, a DCSP can send a message to the DCSP registry component in the broker 250 with a network address where it can be contacted. Furthermore, TAOSs and DCSPs can send query messages to either registry to retrieve messages containing lists of registered DCSPs or TOASs.

Messages would typically be in XML, but could also be represented in other common formats.

In another embodiment, the two registries in the broker 250 can store metadata about the DCSP or TOAS. In the case of a TOAS, the metadata that may be stored within the registry may include the task-oriented metadata, the outgoing rules, and the incoming rules. How much of that data to store within the broker is at the discretion of the person or organization that has control of the broker. Through the outgoing-rules, individual TOASs can limit what information is communicated to the broker registry. The information in the TOAS registry can then be queried by a DCSP. In the case of the DCSP registry, DCSPs can store digital content records in the DCSP registry. TOASs can then query the DCSP registry to search for digital content records.

In another embodiment, the broker 250 includes a mediation component 254. The mediation component looks for digital content records in the DCSP registry that match the task-oriented metadata or the TOAS incoming-rules in the TOAS registry. The matching process between a DCSP and a TOAS may involve a business contract between the DCSP and the TOAS. For example, the organization or person operating the DCSP may be required to pay for having the DCSPs content forwarded to the TOAS. Conversely the person or organization operating the TOAS may have to pay for having the appropriate DCSP digital content records sent to them. In one embodiment, the algorithm for matching digital content records to TOAS involves taking each digital content record, and computing the similarity between it and each user's task-oriented metadata. Similarity is computed as the number of overlapping properties in the digital content record and the task-oriented metadata from one TOAS. When a mediation component 254 exists, a DCSP does not have direct access to data within the TOAS registry—it must send requests to the mediation component 254. The mediation component will apply business rules to determine if a DCSP should be allowed the data it has requested. The same is true for a TOAS querying the DCSP registry 252.

In another embodiment, task-related metadata is only transmitted to a DCSP after a user agrees to receive particular content from the DCSP, e.g., a specific advertising offer. For example, lists of potential offers or advertisements are sent from a DCSP to a user's computer and matched with task-related metadata on the user's computer. If a match is found, the user is queried if they would like to receive offers, or if the user would like to receive a specific offer. If the user agrees, then their task-related metadata specific to the offer can be sent to an advertiser via the DCSP, or the user may just be taken directly to the website of the advertiser. Potential offers or advertisements may include the DCSP's entire catalog of offers and advertisements. Alternatively, a DCSP may send its catalog of offers and advertisements to a mediation component 254 of broker 250, which identifies the TOAS users with metadata most similar to the offers/advertisements and forwards the potential offers to the TOAS. Another alternative is that a TOAS will publish in the TOAS registry 252 high level task-oriented metadata describing at a aggregate level their user's preferences and actions. A DCSP can then access registry 252 and use that information to choose potential offers/advertisements to forward to a TOAS, potentially through the mediation component 254.

Figure 5:
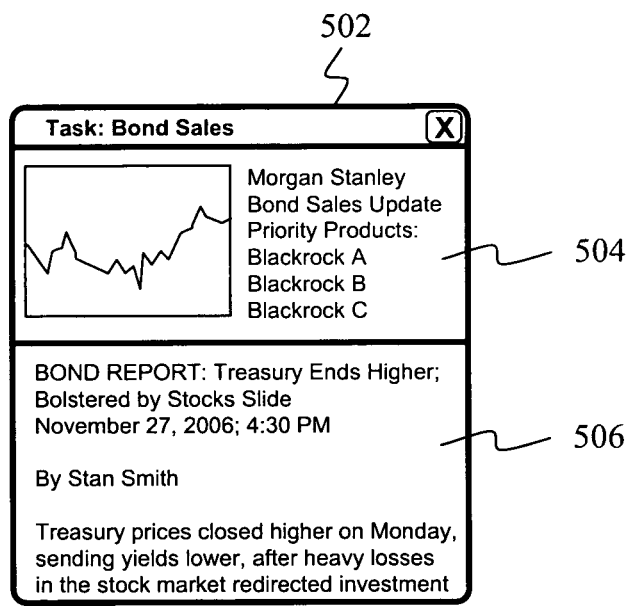
FIG. 5 illustrates a user interface window used to display task-related digital content according to an embodiment of the invention.

In another embodiment of the invention, the task-related digital content is returned and presented in the form of a "dashboard" or "portal page", i.e., one or more discrete items of relevant task-related digital content that are formatted and presented together in an organized fashion to the user as illustrated in FIG. 5, where the window 502 contains panes 504 and 506 displaying graphical and text information. For example, discrete items of digital content can be presented together as a web page. The placement of information on the web page can be predefined, or the user can specify the placement of the information either through a macro language or by direct drag-and-drop placement. When the current task changes, the digital content on the web page will automatically change as well. For instance, the user's current task may change to "Budget". The web page would automatically pull in related emails, related information from a Sharepoint database, and the most recent Excel budget spreadsheet from the user's local hard disk and display them all together in a formatted web page. In another example, the user may switch task to "Trip to Europe", and the task-oriented user activity system will proactively assemble information on plane fares, schedules, and the latest articles on traveling in Europe from the *New York Times* and present them in a formatted web page.

In the corporate information worker environment, the user could have a standard corporate web page (often referred to as a "portal page") with relevant information pulled from corporate servers. For instance, when a user switched tasks to "New Email System Project", the web page would automatically update to show a status report on what work had been performed on the project to date, a timeline showing the discrete tasks remaining to be completed for the project, and a set of instructions for testing out the new email system.

In another embodiment of the invention, task-specific digital content can be additionally sent from the DCSP across a network to another computer or mobile device based on the current task. For instance, a user may have a standard set of tasks that they have defined, and they can then identify certain tasks as "replication tasks". These replication tasks will automatically signal the DCSP to send task-specific digital content to another computer, server, or mobile device. For instance, a user could identify a task called "Stock Watch List". They could then identify this task as a "replication task" and identify the task-specific digital content they want to display on their mobile phone as well as their desktop computer—such as a set of stock price quotes, and any news items associated with those particular stocks. When they changed to the task "Stock Watch List", the DCSP would send the digital content to the mobile phone where the user could view it. Alternatively, after receiving the digital content at the computer, it could be forwarded by the computer to the mobile phone.

In one embodiment, a DCSP may identify a number of task-related "user contexts" that are of value to the DCSP or to other DCSPs. A context represents a situation that a user can be in that can be identified by examining the metadata received from the user. For example, one possible context is that a user in a particular zip code is shopping for a car. This context could be identified by looking at the metadata and seeing that the metadata attributes corresponding to these criteria are set in the user's current task. Advertisers may then pay to have advertisements placed within the user's attention while those contexts are active. The DCSP can either set fixed prices for advertisements or can auction advertising slots for each user context. For example, a car sales company located near a user's residence may pay to place advertisements within the user's attention whenever it is detected that a user is in the process of shopping for a car.

In another embodiment of the invention, the broker 250 acts as a middleman and publishes a database schema.

Advertisers can submit to broker 250 simple or complex queries describing the contexts that they are interested in, using a database query language such as SQL. For example, an advertiser may want to advertise to all users who are in the process of looking for a car, who live within 20 miles of the advertiser's car sales lot, whose past purchasing history suggests that they have enough money to buy a car without hardship, and who seem to have lots of friends (or least have lots of people that they maintain email and instant message communication with). The mediation component 254 of broker 250 programmatically receives requests to advertise given particular queries. From a business model perspective, pricing will likely be based on the number of clauses in the query, or in other words, how specific the query is. Another business model has the pricing based on the number of target users—the smaller and more refined the targeted audience is, the more expensive.

In another embodiment, DCSP 240 creates custom metadata generation plug-ins that can be distributed to users and installed. These metadata plug-ins are software components that take as input the user interaction event stream from the task-oriented user activity system 206 and generate metadata for the DCSP. These metadata plug-ins can implement complex customized metadata generation rules. For example, advertisers may be willing to pay for situations like the following: the user is trying to buy a car, has researched a specific type of car, has received a price quote from a competing car sales company, and that quote is above a certain minimum price, and the user has not yet purchased that car. These plug-ins can be distributed with the task-oriented software on the user's computer, so that they can programmatically monitor if the user has entered the desired state, and notify the DCSP or trigger an advertisement.

In another aspect of the invention, the metadata, event, and/or task information provided by the task-oriented user activity system 206 is combined with a database 216 containing information that lists resources that a user may use in their day-to-day activities in pre-classified categories that are useful for determining user activity. For instance, a database of websites categorized by product (for example, websites related to cars) can be combined with the event tracking provided by the task-oriented user activity system to recognize when a user is shopping for cars online. In another example, a database of websites categorized by research area (e.g., websites for searching scientific articles) can be combined with the event tracking to recognize when a user is researching a particular scientific subject.

Each time digital content is presented to the user, the metadata plug-in monitors and records the response of the user to the content. In the preferred embodiment of the invention, the displayed digital content contains active links or buttons that the user can click to learn more about the digital content (e.g., to receive detailed product descriptions, price information, etc.). Clicking on these links typically launches a web browser or secondary window and takes the user to content provided by the DCSP or its clients. The task-oriented user activity system captures these click actions and stores them. In addition, the metadata plug-in is able to determine (using the methods described above) whether the user proceeds to make a purchase at the web site. This information is stored in the task-oriented user activity system database, and it permits the system to produce statistics on such factors as (a) the percentage close or purchase rate, (b) the number of offers the user examines before making a decision, (c) the expected time to make a decision on a purchase (e.g., as a function of price and other product attributes), and (d) the user's preferred DCSPs and vendors. This information can be communicated to DCSPs as additional metadata for future purchases.

The metadata plug-in makes it easy for users to switch among tasks and then resume a previous task at a later time. When the user resumes working on a task, the metadata plug-in presents the user with a menu of previously-explored digital content (especially, offers to the user from DCSPs) for items that the user has explored but not yet purchased. The user can configure this menu to automatically request and display updated offers from the DCSPs. Alternatively, the user can click on individual offers and request that they be updated. This provides additional metadata to be associated with the current task and confirms that the user is still interested in making a purchase.

Users often use internet search engines to locate relevant information related to a task. Commercial search engines usually return, in addition to search results, supplementary digital content (typically advertisements) that is related to the user's query. In one embodiment of the invention, the metadata plug-in intercepts internet search results and modifies the display of the returned search results and/or supplementary digital content to include more relevant digital content based on the current task and/or historical purchase behavior.

The invention claimed is:

1. A computer-implemented method for automatically presenting digital content to a user of a computer, the method comprising:
   the computer receiving input from a user corresponding to a current task being performed by the user;
   the computer computing task-related metadata from: i) the current task being performed by the user, ii) past event records stored in a database of a task-oriented user activity system, and (iii) credential data associated with the user, wherein computing the task-related metadata includes predicting a predicted task of the user, wherein predicting the predicted task includes determining that performing the current task indicates a probability of subsequently performing the predicted task and includes using the past event records, and wherein the task-related metadata includes information that is relevant to the predicted task and that includes information corresponding to the credential data associated with the user;
   the computer communicating the task-related metadata to a digital content service provider via a data network;
   the digital content service provider extracting the information from the task-related metadata and determining, using the extracted information, digital content relevant to a profile of the user, wherein the profile of the user is specified according to the predicted task and the credential data associated with the user, and wherein the information relevant to the predicted task and the information corresponding to the credential data that are included in the task-related metadata determine the digital content that is selected by the digital content provider after extracting the information from the task-related metadata;
   the digital content service provider communicating the digital content to the computer; and
   the computer presenting the digital content to the user of the computer.

2. The method of claim 1 wherein the task-related metadata is computed also from a most recent event record representing a current interaction of the user with the computer.

3. The method of claim 1 wherein the task-related metadata is computed also from a most recent specification received from the user of a task currently being performed by the user.

4. The method of claim 1 further comprising:
the computer filtering the task-related metadata in accordance with an outgoing filter prior to communicating the task-related metadata to the digital content service provider.

5. The method of claim 1 further comprising:
the computer filtering the task-related digital content in accordance with an incoming filter after communicating the digital content to the computer.

6. The method of claim 1 further comprising:
the computer recognizing when the user is likely engaged in a search for a product, determining characteristics of the product being searched for, and adding the characteristics to the task-related metadata for the predicted task.

7. The method of claim 6, further comprising:
the computer predicting when the user is about to purchase the product.

8. The method of claim 1 further comprising:
the computer recognizing when the user has made a purchase and generating an event indicating that a purchase was made.

9. The method of claim 1 further comprising:
the computer creating relationships among tasks that have resulted in purchases.

10. The method of claim 1 wherein the task-related metadata is computed also from information stored in a resource database, wherein the information comprises categorized resources accessed by the user.

11. The method of claim 1 wherein presenting the digital content to the user of the computer comprises assembling the digital content in a user interface window.

12. The method of claim 1 further comprising:
the computer communicating the digital content to a second computer; and
the second computer presenting the digital content to a user of the second computer.

13. The method of claim 1 further comprising:
the computer prompting the user to specify metadata associated with a task.

14. The method of claim 1 further comprising:
the computer identifying keywords in a user-specified text description of the current task, and selecting metadata based on matching the identified keywords with keywords in a database containing predetermined keywords and associated metadata.

15. The method of claim 1 wherein communicating the task-related metadata from the computer to the digital content service provider comprises using a set of rules to schedule transmission of specified classes of the task-related metadata.

16. The method of claim 1 wherein determining digital content relevant to the predicted task from the task-related metadata comprises matching the task-related metadata with a set of predetermined user contexts and selecting content associated with matching contexts.

17. The method of claim 1 wherein determining digital content relevant to the predicted task from the task-related metadata comprises determining the digital content relevant to the predicted task using relationships between tasks.

18. The method of claim 1 further comprising:
the computer replicating task-related metadata across a set of tasks based on relationships between tasks.

19. The method of claim 1 wherein presenting the digital content to the user of the computer comprises automatically filtering the digital content based on the predicted task.

20. The method of claim 1 further comprising:
the computer modifying the contents of a web browser window containing internet search results, wherein the modification is based on the predicted task.

21. The method of claim 1 further comprising:
the computer displaying to the user a list of purchases associated with the predicted task.

22. The method of claim 1 wherein the task-related metadata is computed also from a list of products associated with the predicted task.

23. The method of claim 1 wherein presenting the digital content to the user of the computer comprises automatically filtering the digital content based on a list of product items associated with the predicted task.

24. The method of claim 1 further comprising:
the computer monitoring and recording responses of the user to the presented digital content.

25. A computer-implemented method for automatically presenting digital content to a user of a computer, the method comprising:
the computer receiving input from a user corresponding to a current task being performed by the user;
the computer computing task-related metadata from: i) the current task being performed by the user, ii) past event records stored in a database of a task-oriented user activity system, and (iii) credential data associated with the user, wherein computing the task-related metadata includes predicting a predicted task of the user, wherein predicting the predicted task includes determining that performing the current task indicates a probability of subsequently performing the predicted task and includes using the past event records, and wherein the task-related metadata includes information that is extractable by a digital content service provider and that is relevant to the predicted task and that further includes information corresponding to the credential data associated with the user;
the computer communicating the task-related metadata to the digital content service provider via a data network;
the computer receiving, from the digital content service provider, digital content relevant to the a profile of the user, wherein the profile of the user is specified according to the predicted task and the credential data associated with the user, and wherein the information relevant to the predicted task and the information corresponding to the credential data that are included in the task-related metadata determine the digital content that is selected by the digital content provider after extracting the information from the task-related metadata; and
the computer presenting the digital content to the user of the computer.

26. The method of claim 25 wherein the task-related metadata is computed also from a most recent event record representing a current interaction of the user with the computer.

27. The method of claim 25 wherein the task-related metadata is computed also from a most recent specification received from the user of the current task.

28. The method of claim 25 further comprising:
the computer recognizing when the user is likely engaged in a search for a product, determining characteristics of the product being searched for, and adding the characteristics to the task-related metadata for the predicted task.

29. The method of claim 25 wherein the task-related metadata is computed also from information stored in a resource database, wherein the information comprises categorized resources accessed by the user.

30. The method of claim 25 further comprising:
the computer identifying keywords in a user-specified text description of the current task, and wherein computing the task-related metadata based on the current task includes matching the identified keywords with keywords in a database containing predetermined keywords and associated metadata.

31. The method of claim 25 wherein communicating the task-related metadata from the computer to the digital content service provider comprises using a set of rules to schedule transmission of specified classes of the task-related metadata.

32. The method of claim 25 wherein determining digital content relevant to the predicted task from the task-related metadata comprises determining the digital content relevant to the predicted task using relationships between tasks.

33. The method of claim 25 further comprising:
the computer replicating task-related metadata across a set of tasks based on relationships between tasks.

34. The method of claim 25, wherein the past event records include websites previously accessed by the user, and wherein the credential data includes at least one of: credit card membership information, credit data, purchase history information, address information or contact information.

35. The method of claim 1, wherein the past event records include websites previously accessed by the user, and wherein the credential data includes at least one of: credit card membership information, credit data, purchase history information, address information or contact information.

* * * * *